June 4, 1957　　　　D. B. BROUGHTON　　　　2,794,839
PROCESS FOR SIMULTANEOUS RECOVERY OF AROMATIC AND
NAPHTHENIC HYDROCARBONS FROM HYDROCARBON MIXTURES
Filed April 12, 1954
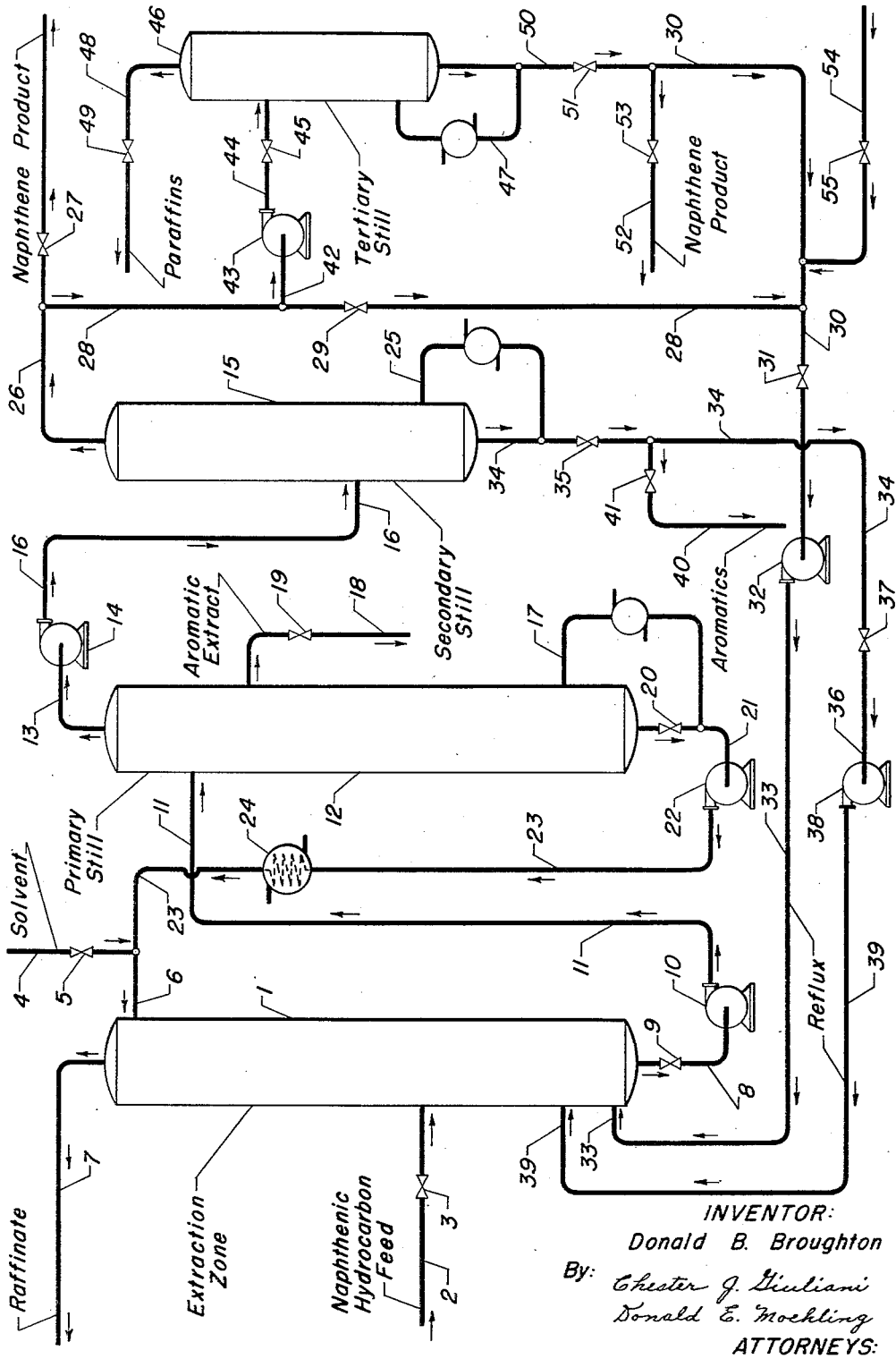
INVENTOR:
Donald B. Broughton
By: Chester J. Giuliani
Donald E. Moehling
ATTORNEYS:

United States Patent Office 2,794,839
Patented June 4, 1957

2,794,839

PROCESS FOR SIMULTANEOUS RECOVERY OF AROMATIC AND NAPHTHENIC HYDROCARBONS FROM HYDROCARBON MIXTURES

Donald B. Broughton, Chicago, Ill., assignor to Universal Oil Products Company, Des Plaines, Ill., a corporation of Delaware Application April 12, 1954, Serial No. 422,391

8 Claims. (Cl. 260—666)

This invention relates to the process for separating and recovering naphthenic hydrocarbons from other classes of hydrocarbons in admixture therewith such as mixtures comprising petroleum derived feed stocks containing one or more hydrocarbon classes, including paraffins, naphthenes, olefins and aromatics. More specifically, the invention concerns a process for recovering naphthenic hydrocarbons from homologous and analogous hydrocarbon types utilizing a solvent extraction procedure in combination with the fractional distillation of the extract product whereby the naphthenic hydrocarbon content of the hydrocarbon feed is successively segregated from aromatics and paraffins mixed therewith and which normally form constant boiling or azeotropic mixtures when such a mixture is subjected to simple or fractional distillation.

The principal objective of the invention, therefore, is to prepare substantially pure concentrates of naphthenic hydrocarbons consisting essentially of a single individual naphthene and to effect the separation of such naphthenes from mixtures thereof with other hydrocarbons by simple and expeditious means.

In one of its embodiments the present invention relates to a process for separating a naphthenic hydrocarbon from a hydrocarbon mixture comprising homologous and analogous hydrocarbons of greater molecular weight which comprises subjecting said hydrocarbon mixture to solvent extraction in a solvent-hydrocarbon contacting zone utilizing a solvent in which said naphthenic hydrocarbon is soluble to form thereby a fat solvent containing said naphthenic hydrocarbon, distilling the resulting fat solvent to separate a primary overhead comprising said naphthenic hydrocarbon, subjecting said primary overhead to secondary distillation to separate a secondary overhead comprising predominantly said naphthenic hydrocarbon and recycling a portion of the secondary overhead to said contacting zone as a reflux therein for displacing homologous and analogous paraffinic and naphthenic hydrocarbons from said fat solvent stream.

A more specific embodiment of the invention relates to a process for separating cyclopentane from a hydrocarbon mixture comprising $C_5$ and $C_6$ hydrocarbons, including benzene and paraffinic hydrocarbons, which comprises subjecting said hydrocarbon mixture to solvent extraction in a solvent-hydrocarbon contacting zone utilizing therein a solvent in which said naphthenic hydrocarbon is soluble, forming thereby a fat solvent containing said cyclopentane, distilling the resulting fat solvent and separating a primary overhead comprising said cyclopentane, subjecting said primary overhead to secondary distillation to separate a secondary overhead comprising predominantly cyclopentane from a secondary bottoms comprising benzene, subjecting said secondary overhead to tertiary distillation to separate a tertiary overhead comprising paraffinic hydrocarbons present in said mixture from a tertiary bottoms consisting essentially of cyclopentane, and recycling said secondary bottoms and a portion of said tertiary bottoms to the contacting zone as a reflux stream therein to effect displacement of naphthenic and paraffinic homologs of higher molecular weight than cyclopentane from said fat solvent.

Suitable feed stocks utilizable in the process of this invention are hydrocarbon mixtures generally containing any recoverable proportion of naphthenic hydrocarbons in admixture with other hydrocarbons of aromatic, paraffinic or olefinic structure, and of any molecular weight. Feed stocks which are particularly adapted to the present process are selected from naturally occurring hydrocarbon mixtures or mixtures which are the product or a fraction of the product of a hydrocarbon conversion process and which boil at a contant temperature as an azeotrope normally inseparable by simple or fractional distillation means. Thus, the conversion products of hydroforming and many other processes contain paraffinic, olefinic, aromatic and naphthenic hydrocarbons having a wide range of molecular weights, which when subjected to distillation yield azeotropic mixtures containing components of the same molecular weight or adjacent homologs. Illustrative of such a separation problem is the segregation of cyclopentane from a hydrocarbon mixture comprising benzene, analogous pentanes and hexanes, the fraction containing all of the benzene initially present in the mixture also containing the aliphatic pentanes, cyclopentane and the aliphaic hexanes as a constant boiling azeotrope mixture thereof. Similarly, in the case of hydrocarbon fractions containing all of the toluene present in the hydrocarbon mixture such fraction also contains cyclohexane and the aliphatic hexanes and heptanes initially present in the mixture.

The segregation of the substantially pure individual hydrocarbon components from hydrocarbon mixtures comprising azetropic or constant boiling mixtures of aromatic, naphthenic and aliphatic hydrocarbons (which azeotropes are normally inseparable by fractional distillation methods) is feasible by means of the present process employing a method of separation which is based upon differences in chemical structure of the azeotropic components, not merely upon physical differences such as boiling points. One of the most widely used methods of this type for separating such mixtures, particularly for the recovery of aromatic hydrocarbons in substantially pure form from paraffinic hydrocarbon components of the mixture is the so-called solvent extraction process which utilizes a solvent having a greater selectivity and solvency for the aromatic component than for the paraffins contained in the mixture. Such selective solvents may be selected from a wide variety of normally liquid organic compounds of generally polar character (that is, compounds containing a polar radical), and which boil at temperatures above the boiling point of the hydrocarbon mixture at the ambient extraction pressure. Typical general classes of compounds having such selective solvent action on aromatic hydrocarbons are the alcohols and phenols, ethers, nitriles, and esters, which may have their solvency and selectivity characteristics modified by the inclusion in the solvent composition of an anti-solvent, such as water, which increases the selectivity of the solvent for the aromatic hydrocarbon component and simultaneously reduces the solvency of the composition for at least the non-aromatic and/or other aromatic components of the mixture. Illustrative specific organic compounds useful as selective solvents in extraction processes for the segregation of individual components from hydrocarbon mixtures include the alcohols, such as methanol, ethanol and higher homologous monohydric alcohols, generally up to and including octanol and its isomers; the glycols, such as ethylene glycol, propylene glycol, butylene glycol, and amylene glycol, trimethylene carbinol, glycerol, etc.; phenols such as phenol itself, one or more of the cresols and xylenols, such as ortho-, meta-, or para-methylphenol, 3,5-dimethylphenol, 2,6-dimethylphenol, etc., alpha-naphthol, beta-naphthol, etc. ethers such as di-isopropyl ether, di-n-butyl ether, di-isoamyl ether etc.; the glycol-ethers, such as diethylene glycol, dipropylene glycol, dimethyl ether of ethylene glycol, triethylene glycol, tripropylene glycol, $\alpha,\alpha'$-dihydroxyethylpropyl ether, methylphenolate, etc.; nitriles such as $\beta,\beta'$-oxydipropionitrile; esters such as glycol diacetate etc.; and other organic solvents well-known in the art for extraction of hydrocarbon components from mixtures thereof with other hydrocarbons. One of the preferred classes of solvents for the present aromatic-cyclo-paraffin extraction process which is particularly suitable for the recovery of highly concentrated aromatic extracts are the glycol ethers, such as diethylene glycol, dipropylene glycol, mixtures of diethylene and dipropylene glycol, triethylene glycol, tripropylene glycol, tetraethylene glycol and mixed ethers of the ethylene and propylene mono- and poly-glycols or mixtures of the foregoing glycol ethers, preferably modified in their solvency and selectivity characteristics by the inclusion of from about 2% to about 25% by weight of water in the resulting glycol ether solution.

In such solvent extraction processes an extract is formed containing the aromatic, naphthenic as well as smaller proportions of the paraffinic and olefinic components of the hydrocarbon mixture dissolved in the solvent, the extract phase which is also referred to as a fat or rich solvent phase being separated from the raffinate or undissolved hydrocarbon phase and separately treated to recover the hydrocarbon solute from the solvent, usually by heating the extract phase to distill over the dissolved hydrocarbon. The latter operation is referred to generally in the art as "stripping" the extract phase of its dissolved hydrocarbons, the hydrocarbon components being vaporized or distilled from the extract phase leaving a stripped or lean solvent phase substantially depleted of its hydrocarbon solute.

It has been common experience in the solvent extraction art, however, that usually the solvent composition is not wholly selective in dissolving only the aromatic components of the hydrocarbon mixture, and a significant proportion of the non-aromatic components of the feed stock may also dissolve in the solvent, such that during the stripping operation, the small quantity of non-aromatic components which dissolve in the solvent to form the rich solvent phase tend to distill overhead with the aromatic product during the stripping operation until the extract is free of its dissolved non-aromatic components. Of the latter which tend to dissolve in the solvent, in addition to the aromatic components, the solvent has a greater selectivity for the lower molecular weight (lighter) hydrocarbons present in the feed stock, including the lower molecular weight naphthenes as well as the lower molecular weight paraffins and olefins, the selectivity factor, $\beta$, for the lighter paraffins, olefins, and paraffins, over their heavier homologs differing in 1 carbon atom per molecule being approximately 1.2 for a diethylene glycol-water solvent containing about 7% by weight of water. This solvent also has a greater selectivity for naphthenes than for aliphatic paraffins of the same number of carbon atoms, the selectivity factor, $\beta$, being about 1.6. Furthermore, the solvent also exhibits a greater selectivity for the lower molecular weight naphthenes as distinguished from their higher molecular weight homologs, the selectivity factor for naphthenes having 1 carbon atom less than the next higher homolog being approximately 1.2. These selectivity relationships which hold true for diethylene glycol-water mixtures as solvents are also true for a wide variety of other solvent compositions, such as the various classes of solvents hereinbefore enumerated, which are commonly used for extracting aromatic components from hydrocarbon mixtures. This relationship, in fact, holds true for solvents generally, making the present invention applicable to such other solvent systems.

The small amount of raffinate components and the aromatic components which dissolve in the extract phase during the extraction stage of the process yield a vapor overhead when the extract or rich solvent phase is subsequently heated in the stripping operation having a boiling point lower than the aromatic component when distilled individually, the last residue of dissolved aromatic components distilling from the rich solvent only after all of the non-aromatic components have been boiled out of the solvent as the vapor overhead. This effect, which is characterized by a reduced volatility of the aromatic solute in the presence of the solvent, is believed to be the result of a specific, as yet undefined combination or complex of the aromatic components in the rich solvent with the solvent itself, effectively raising the boiling point of the aromatic component when distilled over from the extract phase. The vapor overhead, therefore, comprises an impure aromatic concentrate contaminated with the raffinate hydrocarbons which dissolve in the extract phase during the contact of the solvent with the feed stock. Since the solvent has a greater selectivity for the lower molecular weight (lighter) non-aromatic components than for their higher homologs, including naphthenes as well as aliphatic paraffins, the vapor overhead from the stripping column is consequently relatively richer in such lower molecular weight components and because of the greater selectivity of the solvent for naphthenes than for the aliphatic paraffins, the overhead fraction is also relatively richer in the lower molecular weight naphthenes. Although the above selectivity relationships are generally operable in solvent extraction processes for a wide variety of solvent compositions, in each instance it is also generally true that the solvent tends to extract from the feed stock small quantities of the heavier homologs of both the paraffin and naphthene series of hydrocarbons during contact between the feed stock and solvent in the extraction column. Therefore, the latter heavier homologs also make their appearance in the vapor overhead from the stripping column and because of their generally higher boiling point than the lower homologs, they tend to distill over less readily from the rich solvent phase during the stripping operation and are present in the higher boiling sidecuts from the stripper. The result of the latter effect is that larger quantities of the desired aromatic component must be distilled over in the vapor overhead from the rich solvent before the product (aromatic) side cut is clear of non-aromatic contaminants which would otherwise be present in the aromatic product distilled from the rich solvent phase. It therefore becomes desirable to eliminate as completely as possible such heavier homologs from the rich solvent prior to the stripping operation in order to thereby reduce to a minimum the quantity of overhead required to be distilled from the rich solvent before the aromatic (primary product) cut is taken from the stripping column. Since the vapor overhead also contains an appreciable quantity of the desired aromatic hydrocarbons present in the feed stock, it is generally recycled to the extraction column to recover these aromatics and to return the raffinate components contained in the overhead to the raffinate stream leaving the extraction column. In accordance with the discovery of this invention concerning the selectivity of the solvent for the lower molecular weight components of the feed stock and particularly for the light naphthenes, a method is provided whereby the heavier homologs in the fat solvent stream are displaced therefrom by contact of the latter prior to the stripping operation with a reflux stream of light hydrocarbons, preferably the preferentially dissolved light naphthenes. The use of a light naphthene for the reflux stream not only eliminates the heavier naphthenic and paraffinic hydrocarbons from the fat solvent stream by the aforementioned selective displacement effect, but after having once effected complete displacement of heavy paraffins and naphthenes from the fat solvent stream, the reflux thereafter remains free of such heavy non-aromatic hydrocarbons and retains its highly effective character for reflux purposes. Furthermore, by reducing the quantity of recycled vapor overhead through such elimination of heavier homologs from the overhead stream (since less overhead need be distilled from the fat solvent to free the latter of non-aromatic components), the consumption of utilities in the process is reduced substantially and the process is operated on a more economical basis. This objective is accomplished by means of the present invention and a product consisting of pure or a substantially pure light naphthene is recoverd from the process by subjecting the vapor overhead from the stripping column to fractional distillation, recovering a light overhead distillate containing said light naphthenes, and utilizing the latter distillate exclusively as the reflux stream to the extraction column.

The process of the present invention is further described by references to the accompanying drawing which depicts a flow diagram for a continuous countercurrent system for separating a primary product consisting of benzene hydrocarbons and a further primary product consisting of an individual naphthenic hydrocarbon utilizing a solvent which is more dense than the hydrocarbon feed stock mixture, the solvent being introduced into the upper section of the extraction column, the feed stock into the column at an intermediate point, above the point of removal for the extract or fat solvent phase from the bottom of the column and a raffinate phase outlet at the top of the column, the fat solvent phase being contacted with a reflux stream in the lower portion of the column, preferably just prior to removal of the fat solvent from the extraction column. Referring to the accompanying diagram, a hydrocarbon feed stock containing aromatic, naphthenic and aliphatic paraffin components of approximately the same molecular weight, none of which vary by more than one $CH_2$ group, such as an azeotropic mixture of benzene, cyclopentane, hexane, cyclohexane, and pentanes, is charged into extraction zone 1 through hydrocarbon feed line 2 in amounts controlled by valve 3, the hydrocarbon feed stream preferably entering the column at the approximate mid-point thereof or at any point between the top and bottom of the column. A solvent stream having a selective solvent action on the one or more aromatic components of the hydrocarbon feed stock is introduced into the process flow through line 4, containing valve 5, from storage, although in a continuous operation, recycled solvent derived as hereinafter indicated, is generally employed as the principal source of selective solvent introduced into the top of the extraction column. The solvent stream enters the process flow through line 6 connecting with line 4 which leads into column 1 through a suitable solvent inlet port. A countercurrent flow relationship is set up by virtue of the difference in densities of the liquid phases, that is, the solvent and hydrocarbon phases in extraction column 1, the solvent tending to percolate downwardly through zone 1 against a rising stream of hydrocarbon introduced through an inlet port at a lower level in the column. As the solvent flows countercurrent to the hydrocarbon stream it selectively dissolves the aromatic components of the feed stock but a small proportion of the paraffinic and naphthenic components present in the feed stock also dissolve in the solvent, the resulting fat solvent phase becoming richer in aromatic components as it flows through the column by virtue of the aromatics in the incoming feed continuously and selectively displacing dissolved paraffinic components in the fat solvent. The undissolved or non-extracted hydrocarbons in the feed stock, comprising paraffins, naphthenes, and olefins, if any, are removed from the top of the column as a raffinate stream through line 7 and thereafter discharged from the process flow.

The section of the extraction column below the hydrocarbon feed inlet is a zone in which displacement of the heavy naphthenes and paraffins from the rich solvent phase occurs by virtue of the selectivity of the solvent for the light naphthene components in the reflux stream which is introduced into the lower portion of extraction zone 1, as hereinafter described. The displaced heavy naphthenes and paraffins thereafter join the raffinate stream eventually removed from the column through line 7, while the light naphthenes present in the reflux which selectively effects such displacement enter the extract or fat solvent phase as one of the solute components removed from the extraction column through the fat solvent outlet port.

The more dense fat solvent or extract phase accumulating in the lower portion of extraction zone 1 is removed therefrom through line 8 in amounts controlled by valve 9 and transferred by means of pump 10 from line 8 into line 11 leading into the upper portion of primary still 12 wherein the dissolved hydrocarbon solute components are stripped from the fat solvent. Primary still 12 is essentially a distillation column into which heat is introduced from a reboiler, with stripping steam, or into which heat is carried as latent heat of vaporization in the fat solvent stream. Vapor and liquid outlet lines are provided in column 12 to remove a regenerated or "lean solvent" from the bottom of the column, an aromatic extract product as one of the side cut product fractions from the column and a vapor overhead product comprising the non-aromatic components, including light naphthenes, distilled from the fat solvent. Since the boiling points of the paraffin and naphthene solute components present in the fat solvent phase are not increased as greatly in the presence of the solvent as the aromatic components, even though they boil normally at approximately the same temperature as the aromatic component, the light naphthenes which are present in the extract phase by virtue of having displaced heavier paraffins and naphthenes in the reflux section of the extraction column, as well as a small proportion of paraffins (which are only light paraffins because of the displacement of the heavier paraffinic components of the feed stock in the reflux section of the extraction column by the light naphthenes) are removed from primary still 12 as a light vapor overhead fraction through line 13 and transferred by means of pump 14 into secondary still 15 via transfer line 16. The treatment of this fraction, its composition and other aspects relating thereto which constitute the essential elements of the present invention will be hereinafter referred to in greater detail.

The quantity of light vapor overhead removed from primary still 12, determined by the depth of reboiling or the amount of heat introduced into the fat solvent, is ultimately fixed by the quantity required to remove all of the paraffinic and naphthenic components from the fat solvent to leave a fat solvent residue in stripping column 12 containing only aromatic components to be distilled from the fat solvent residue in a higher temperature zone of the column and removed therefrom as a side cut fraction substantially free of contaminating paraffins and naphthenes. A major portion of such aromatic product is recovered from the process by withdrawing a liquid or vapor fraction from primary still 12 through line 18 in controlled amounts, determined by valve 19, at a rate which is fixed by the desired rate of aromatic production and purity of the aromatic product. Steam may be injected into the solvent residue in the column by means not illustrated to strip the lost traces of aromatic solute therefrom. The lean solvent residue remaining after stripping the aromatic, naphthenic and paraffinic components from the fat solvent is removed from the bottom of primary still 12 through line 20 and valve 21, and thereafter transferred by means of pump 22 into line 23 which recycles the lean solvent, free of hydrocarbon components, through heater or cooler 24 and through line 6 into the top of extraction zone 1 for reuse therein as regenerated lean solvent.

The overhead from primary still 12 transferred via line 16 into secondary still 15, as hereinbefore indicated, contains substantially all of the naphthenic and paraffinic components extracted from the feed stock by the solvent and contains, in addition, a portion of the extracted aromatic components which are vaporized from the fat solvent during the primary distillation with the naphthenes and paraffins to thereby provide a fat solvent residue containing only aromatic solute components. In order to separately recover the aromatic and naphthene components from the vapor overhead, the latter is subjected to redistillation in secondary still 15 by means of heat introduced into the column by reboiler 25. The distillation occurring in secondary still 15 provides a true separation on the basis of the natural boiling points of the hydrocarbon components, which are not affected by the presence of the solvent in secondary still 15. Because of the selective displacement of heavy naphthenes and paraffins from the fat solvent phase by the light naphthene recycle stream introduced into extraction zone 1, in accordance with the process of this invention, the vapor overhead from column 15 comprises predominantly these light naphthenes. A portion of the vapor overhead from secondary still 15, however, may also comprise light aliphatic paraffins not wholly displaced from the fat solvent stream in the reflux section of extraction zone 1. Therefore, if merely a naphthenic hydrocarbon concentrate containing from 95 to about 99.5% of naphthenes is desired as product of the process, the vapor overhead from column 15 removed through line 26 and valve 27 may be withdrawn directly without further treatment as the product of the process.

In order to supply extraction zone 1 with the minimum quantity of light naphthenes to effect the displacement of heavy naphthenes and paraffins from the fat solvent stream prior to the stripping stage, at least a portion of the vapor overhead removed from secondary still 15 through line 26 or the same naphthenic hydrocarbon from a source extraneous to the process must be introduced into extraction zone 1 as said reflux stream, the portion of the overhead from column 15 utilized as such reflux being removed from line 26 through line 28 and valve 29, and discharged into recycle line 30, from which it is conveyed through valve 31 by means of pump 32 into line 33, which supplies the lower portion of extraction zone 1 with the required reflux. As indicated, the source of such light naphthene reflux may be derived from other sources, but is most conveniently taken as a side stream from the naphthene product of the present process. The light paraffins and naphthenes contained in this reflux stream effect the aforementioned selective displacement of heavy paraffins and naphthenes from the fat solvent stream as hereinbefore described by virtue of the selectivity of the solvent for the lower molecular weight homologs. Generally, the stream of naphthenes removed as product through valve 27 represents only a small proportion of the total vapor overhead from secondary still 15, the ratio of product removed permanently from the process flow through valve 27 to the total inventory being from about 5 to 95 to about 25 to 75.

The liquid residue remaining in secondary still 15 after removal therefrom of the light naphthenes and paraffins as vapor overhead comprises predominantly aromatic hydrocarbons which may be withdrawn from column 15 as liquid bottoms through line 34 in amounts controlled by valve 35. This material also constitutes a desirable source of reflux, since the aromatic components therein tend to selectively displace from the fat solvent the less readily dissolved paraffinic and naphthenic components present in extraction zone 1. Thus, all or a portion of the aromatic liquids bottoms product from secondary still 15 may be led into reflux recycle line 30 for recycling to the bottom of extraction zone 1 as aforesaid, through line 33. In an alternate method of recycling such reflux, valve 31 may be closed and the stream thus diverted into line 36, through open valve 37, and transferred by means of pump 38 and line 39 into extractor 1, being preferably introduced therein at a point intermediate the extract outlet port in the bottom of the column and the feed inlet port in the mid portion of the column, thereby recovering the aromatics from this stream by extraction in zone 1. Any high boiling naphthenes or paraffins which may be present in this stream and which may become dissolved in the fat solvent are displaced therefrom by the light naphthenes in the light overhead from secondary still 15 comprising reflux charged into the column below the point of introduction for the aromatic stream. The fat solvent is thus subjected to a final displacement purification by the light naphthene reflux just prior to the stripping operation. All or a portion of the liquid bottoms from secondary still 15 may also be withdrawn from line 34 through line 40 and valve 41 as aromatic product, if desired.

If a naphthenic hydrocarbon concentrate of a high degree of purity is the desired end product of the present process, the vapor overhead from secondary still 15 may be subjected to tertiary distillation to separate the light paraffins from the naphthenes contained in this vapor overhead. Since the paraffin analogs of any particular naphthenic hydrocarbon boil at a substantially lower temperature than the naphthene itself, the separation of the paraffins from naphthenes present in the vapor overhead of column 15 may be effected by fractional distillation of the vapor overhead from column 15 in a tertiary still such as column 46. For this purpose valve 27 is closed, thereby directing the vapor overhead from secondary still 15 into line 42 and pump 43 transfers the overhead through line 44 and valve 45 into said tertiary still 46 for effecting the aforementioned separation between paraffins and naphthenes. Still 46 contains a reboiling coil 47 which introduces heat into the still contents and generates a vapor fraction removed as an overhead distillate through line 48 and valve 49 to a product receiver, not illustrated. Because of the aforementioned greater volatility of the aliphatic paraffin analogs of the naphthenes having the same number of carbon atoms, the vapor overhead removed through line 48 is predominantly composed of aliphatic paraffins. The liquid bottoms from tertiary still 46 consists almost exclusively of the light naphthenes originally present in the feed stock and constitutes one of the desired end products of the present process. These are removed from still 46 through line 50 and valve 51, but because of the necessity of providing a source of light naphthenes for use as reflux in the process in the event that none of the secondary overhead from line 26 is recycled to extraction zone 1 as reflux at least a portion of the naphthene product removed through line 50 is discharged into reflux recycle line 30, thereafter to be recycled to the lowermost reflux section of extraction zone 1, as hereinbefore described. The portion of the naphthene bottoms removed from still 46 as ultimate product of the present process is withdrawn from line 50 through line 52 connecting therewith and valve 53 in amounts controlled to provide the desired yield of naphthenic product. Generally, the proportion of naphthenes recovered as product to total naphthene inventory (i. e. combined recycled reflux and naphthenes in the feed stock) is not greater than from about 5 to 95 to about 25 to 75 parts per parts by weight. A naphthenic stream from any other source is, of course, equally as effective as the present naphthene product as a reflux stream and when desired, such external source of naphthene, either as a pure or as a substantially pure concentrate thereof may be supplied to the process through line 54 connecting with line 30 in amounts determined by valve 55 in line 54. The external naphthene may be of lower molecular weight, such as the next lower homolog, to provide more effective displacement of paraffins from the fat solvent, the external naphthene being thereafter recovered in the light overhead from tertiary still 46.

It is, of course, feasible within the provisions of the present invention to recover a portion of the total naphthenic product as highly purified material through line 52 and a portion of less pure product through line 26, the ratio between the respective streams being set as desired.

This invention is further illustrated with respect to several of its embodiments in the following example, the charge stock, process conditions, solvent and other operating factors recited therein not to be construed as limiting the scope of the invention necessarily in accordance therewith.

A hydrocarbon fraction boiling from 70° to 150° C. of the conversion product of the "Platforming" process, the product formed by subjecting a naphthenic straight-run fraction of a petroleum crude to hydroforming reaction conditions in the presence of a "Platforming" catalyst, comprising platinum supported on an alumina-halogen composite, is utilized as feed stock in a liquid-liquid countercurrent extraction process employing a 7.5% aqueous diethylene glycol as the lean solvent charged to the extraction tower. The hydrocarbon feed stock contains a total aromatic hydrocarbon content of 32.1% by weight, the following aromatics being present in their indicated proportions:

| | Percent |
|---|---|
| Benzene | 19.1 |
| Toluene | 8.4 |
| Xylenes | 4.6 |

This fraction also contains about 8.4% by weight of naphthenes of the following species:

| | Percent |
|---|---|
| Cyclopentane | 6.1 |
| Cyclohexane | 1.9 |
| Cycloheptane | 0.4 |

The remainder of the fraction consists of paraffins of both straight and branched chain structure and containing from 5 to 8 carbon atoms.

The solvent is introduced into the top of the extraction column containing 63 stages at the rate of 8,040 gallons/hr. while the hydrocarbon feed stock is charged onto the 39th plate from the top of the column at the rate of 700 gallons/hr. A reflux fraction having the composition and derivation hereinafter indicated is charged onto the bottom plate of the column at a rate of 155 gallons/hr. The extraction is effected at a temperature of 270° F. and at a pressure of 90 lbs./in.$^2$.

An extract or fat solvent phase is removed from the bottom of the extraction column while a raffinate is continuously removed from the top of the column. The raffinate which is largely paraffinic contains no cyclopentane, and about 3.4% by weight of $C_6$ and $C_7$ naphthenes, as well as about 2.3% xylenes and toluene. The fat solvent phase at the above temperature and pressure is transferred to a stripping tower comprising a bubble plate fractionating column having two uppermost pressure release sections in which the pressure is successively reduced in stages to approximately atmospheric pressure, accompanied by vaporization of the solute hydrocarbon components from the fat solvent stream. A light vapor overhead fraction is removed from the first pressure reduction section at a volume rate of flow of 192 gallons/hr. Its composition is as follows:

| | Percent |
|---|---|
| Pentane | 3.5 |
| Cyclo $C_5$ | 28.0 |
| Hexanes | 2.1 |
| Cyclo $C_6$ | 0.3 |
| Benzene | 65.8 |
| $C_6+$ | 0.3 |

A fraction removed from the second pressure reduction section in the amount of 148 gallons/hr. contains the following hydrocarbons in their indicated proportions:

| | Percent |
|---|---|
| $C_5$ | 4.5 |
| Hexanes | 0.3 |
| Cyclo $C_6$ | 0.4 |
| Benzene | 94.8 |
| $C_6+$ | 0.1 |

This fraction is combined with the light vapor overhead and reserved for subsequent fractionation to separate a cyclopentane fraction and a reflux stream for recycling to the extractor. A third side-cut fraction is removed from the mid-section of the stripping column at a rate of flow of 198 gallons/hr. having the following composition:

| | Percent |
|---|---|
| Benzene | 62.6 |
| Toluene | 29.2 |
| Xylenes | 8.1 |
| Non-aromatic | <0.1 |

A regenerated lean solvent stream is removed from the bottom of the stripping tower, reconstituted to 7.5% water content and recycled at 270° F. and 90 lbs./in.$^2$ pressure to the top of the extraction column.

The combined light vapor overhead and second pressure reduction fraction is subjected to fractional distillation in a secondary still to separate naphthenes from aliphatic paraffins and from the benzene contained in this fraction. The fractionation is effected at atmospheric pressure in a 23 stage bubble-plate column. An overhead fraction in the amount of 87 gallons/hr. is removed from the top of the column; this fraction contains 95.8% by weight of cyclopentane and 3.7% by weight of pentanes and 0.5% by weight of $C_6$ paraffins. A bottoms fraction consisting exclusively of benzene (99.9%) is removed from the reboiling section of the fractionator and divided into (1) a portion consisting of aromatic product and (2) a portion utilized for recycled reflux.

The overhead naphthene product may be subjected to additional fractionation to recover a product consisting of substantially pure (99.8%) cyclopentane by subjecting the overhead fraction from the secondary still to a tertiary fractionation in a separate still. The overhead from this column consists exclusively of $C_5$ and $C_6$ aliphatic paraffins, the bottoms consisting of the aforementioned 99.8% cyclopentane. The cyclopentane product is recovered from the process at a rate of about 47.7 gallons/hr.

In order to maintain the purity of the aromatic and naphthenic fractions produced in the process, a portion of the secondary still overhead, in the amount of 49.8 gallons/hr. is removed from the overhead receiver and utilized as a portion of the reflux recycled into the bottom of the extractor to displace heavy naphthenes and paraffins from the fat solvent prior to stripping. The 49.8 gallons/hr. of light naphthenes and $C_5$ paraffins is combined with 105 gallons/hr. of benzene recovered as bottoms from the secondary still and the combined mixture utilized as the reflux stream. The benzene and cyclopentane contained in this reflux are completely reabsorbed by the solvent, as indicated by analysis of the raffinate stream removed from the top of the extraction column, which analysis indicates that it is substantially paraffinic, containing only about 2.3% aromatics consisting of xylenes and a small amount of toluene, about 0.5% cyclohexane and no detectable quantity of benzene or cyclopentane.

I claim as my invention:

1. A process for the simultaneous recovery of monocyclic naphthenic and aromatic hydrocarbons which comprises subjecting a hydrocarbon mixture containing said naphthenic and aromatic hydrocarbons to solvent extraction in a solvent-hydrocarbon contacting zone utilizing a solvent in which said naphthenic and aromatic hydrocarbons are soluble to form thereby a fat solvent containing said naphthenic and aromatic hydrocarbons, distilling the resultant fat solvent to separate therefrom an aromatic extract and a lighter overhead product containing naphthenic and aromatic hydrocarbons, recovering said aromatic extract, separating said lighter overhead product into a naphthene concentrate and an aromatic fraction, introducing a portion of said naphthene concentrate into the lower portion of said contacting zone and recovering the remainder thereof, and simultaneously introducing at least a portion of said aromatic fraction into the lower portion of the contacting zone.

2. The process of claim 1 further characterized in that the aromatic fraction is introduced to the contacting zone at a higher point than the naphthene concentrate but below the point of introduction of said hydrocarbon mixture.

3. A process for the simultaneous recovery of monocyclic naphthenic and aromatic hydrocarbons which comprises subjecting a hydrocarbon mixture containing said naphthenic and aromatic hydrocarbons to solvent extraction in a solvent-hydrocarbon contacting zone utilizing a solvent in which said naphthenic and aromatic hydrocarbons are soluble to form thereby a fat solvent containing said naphthenic and aromatic hydrocarbons, distilling the resultant fat solvent to separate a primary overhead comprising said naphthenic hydrocarbons, further distilling said fat solvent to separate a fraction comprising said aromatic hydrocarbon of lesser volatility in the presence of said solvent, subjecting said primary overhead to secondary distillation to separate a secondary overhead comprising predominantly said naphthenic hydrocarbons from a secondary bottoms comprising said aromatic hydrocarbon, recycling said secondary bottoms to said contacting zone and introducing the same therein at a point below the introduction of said hydrocarbon mixture, subjecting said secondary overhead to tertiary distillation, recovering a tertiary overhead comprising essentially aliphatic paraffins, recovering a tertiary bottoms fraction consisting essentially of said naphthenic hydrocarbon, and recycling at least a portion of said tertiary bottoms to said contacting zone as reflux therein, introducing said reflux into said zone at a point below the introduction of said secondary bottoms stream.

4. The process of claim 3 further characterized in that said naphthenic hydrocarbon is cyclopentane.

5. The process of claim 3 further characterized in that said aromatic hydrocarbon is benzene.

6. The process of claim 3 further characterized in that said aromatic hydrocarbon is a mixture comprising benzene and toluene.

7. The process of claim 3 further characterized in that said naphthenic hydrocarbon is cyclohexane and said aromatic hydrocarbon is at least one hydrocarbon selected from the group consisting of toluene and xylene.

8. A process for separating cyclopentane from a hydrocarbon mixture comprising $C_5$ and $C_6$ hydrocarbons, including benzene and cyclopentane, which comprises subjecting said hydrocarbon mixture to solvent extraction in a solvent-hydrocarbon contacting zone utilizing therein a solvent in which cyclopentane is soluble, forming thereby a fat solvent containing said cyclopentane, distilling the resulting fat solvent and separating a primary overhead comprising said cyclopentane, subjecting said primary overhead to secondary distillation to separate a secondary overhead comprising predominantly cyclopentane from a secondary bottoms comprising benzene, subjecting said secondary overhead to tertiary distillation to separate a tertiary overhead comprising paraffinic hydrocarbons present in said mixture from a tertiary bottoms consisting essentially of cyclopentane, and recycling said secondary bottoms and a portion of said tertiary bottoms to said contacting zone as a reflux stream therein to effect displacement of paraffinic and naphthenic homologs of higher molecular weight than cyclopentane from said fat solvent.

References Cited in the file of this patent
UNITED STATES PATENTS

| | | |
|---|---|---|
| 2,396,302 | Cummings et al. | Mar. 12, 1946 |
| 2,407,820 | Durrum | Sept. 17, 1946 |
| 2,508,723 | Mayland et al. | May 23, 1950 |
| 2,711,433 | Poffenberger | June 21, 1955 |
| 2,724,731 | Findlay | Nov. 22, 1955 |